US006718606B2

(12) United States Patent
Bassi

(10) Patent No.: US 6,718,606 B2
(45) Date of Patent: Apr. 13, 2004

(54) APPARATUS FOR MOLDING AND APPLYING LINERS IN CAPS

(75) Inventor: Giovanni Bassi, Faenza (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 0 days.

(21) Appl. No.: 10/235,490

(22) Filed: Sep. 6, 2002

(65) Prior Publication Data

US 2003/0066180 A1 Apr. 10, 2003

(30) Foreign Application Priority Data

Sep. 14, 2001 (IT) ..................................... BO2001A0555

(51) Int. Cl.$^7$ ............................................... B23P 21/00
(52) U.S. Cl. .......................... 29/33 K; 29/33 P; 29/36; 29/792; 29/527.1; 29/564.1; 425/809; 425/348 R; 425/DIG. 33; 53/129.1; 53/423; 198/418.3
(58) Field of Search ................................. 29/33 K, 564, 29/564.1, 35.5, 36, 33 J, 33 P, 527.1, 792; 425/809, 348 R, DIG. 33, 3; 53/129.1, 421, 423; 198/418.3, 418.4

(56) References Cited

U.S. PATENT DOCUMENTS

| 3,053,221 A | | 9/1962 | Heffley et al. | |
|---|---|---|---|---|
| 3,135,019 A | * | 6/1964 | Aichele | ....................... 425/809 |
| 3,360,827 A | * | 1/1968 | Aichele | ....................... 425/809 |
| 3,493,995 A | * | 2/1970 | Green | ......................... 425/809 |
| 3,963,396 A | * | 6/1976 | Shotbolt et al. | ............. 425/809 |
| 4,170,445 A | * | 10/1979 | Nishijima | ............... 425/348 R |
| 4,298,320 A | * | 11/1981 | Ohmi et al. | ................. 425/809 |
| 4,336,011 A | * | 6/1982 | George et al. | .............. 425/809 |
| 4,979,282 A | * | 12/1990 | Alieri et al. | ..................... 29/36 |
| 5,007,150 A | * | 4/1991 | Alieri et al. | ................. 29/33 J |
| 5,123,824 A | * | 6/1992 | Alieri | .......................... 425/809 |
| 5,160,018 A | * | 11/1992 | Alieri | ...................... 198/803.6 |
| 5,259,745 A | * | 11/1993 | Murayama | ................... 425/809 |
| 5,786,079 A | | 7/1998 | Alieri | |
| 5,811,044 A | * | 9/1998 | Rote et al. | ................... 425/809 |

FOREIGN PATENT DOCUMENTS

| EP | 0 207 385 | 1/1987 |
|---|---|---|
| EP | 0 451 670 | 10/1991 |
| EP | 0 462 513 | 12/1991 |

\* cited by examiner

Primary Examiner—Erica Cadugan
(74) Attorney, Agent, or Firm—Guido Modiano; Albert Josif; Daniel O'Byrne

(57) ABSTRACT

An apparatus for molding and inserting in caps liners made of plastic material dispensed by an extruder, comprising: a dosage carousel; a molding carousel; an insertion carousel; a cap feeder for feeding the insertion carousel with caps, the carousels being rotatable about vertical axes and provided with seats for supporting multiple shuttles that are angularly equidistant concentrically to the rotation axes of the respective carousels, the dosage carousel having assemblies for taking in succession doses of plastic material from the extruder and depositing them onto the shuttles, the molding carousel having assemblies for molding in succession liners on the shuttles and the insertion carousel having assemblies for removing in succession the liners from the shuttles and inserting them in respective caps fed by the feeder; and a first, second and third star, for shuttle transferring at the respective carousels.

16 Claims, 13 Drawing Sheets

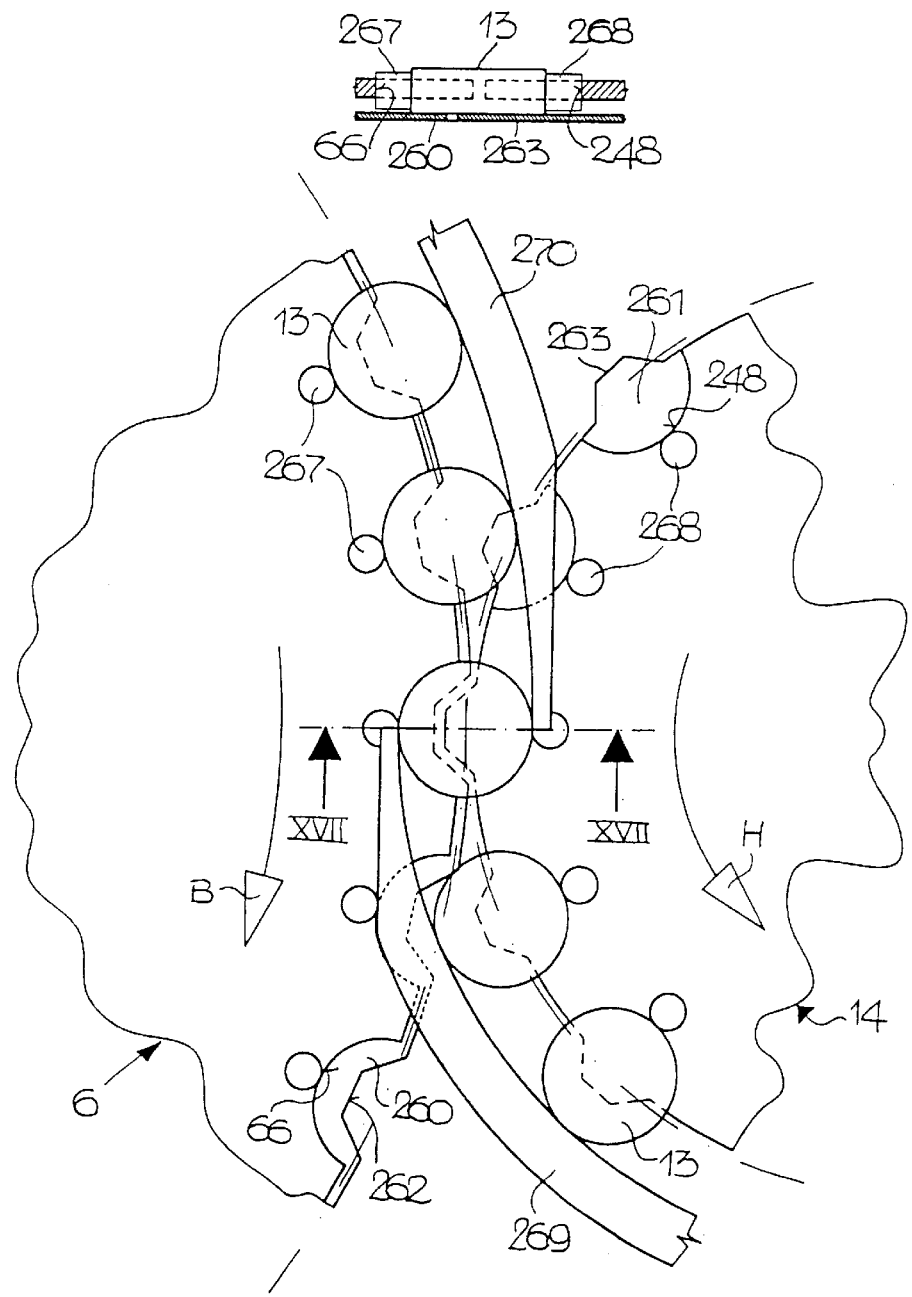

APPARATUS FOR MOLDING AND APPLYING LINERS IN CAPS

BACKGROUND OF THE INVENTION

The present invention relates to an apparatus for molding and applying liners in caps.

According to European patent no. 207385, an apparatus for molding and applying substantially disk-shaped liners in caps are known in the art. This known apparatus comprises a footing, which rotatably supports, so that they are arranged at the vertices of an equilateral triangle and have vertical axes, a carousel for dosing plastic material fed by an extruder, a molding carousel that molds disk-like liners from doses provided by said dosage carousel, and a carousel for inserting the liners in the caps. The doses of plastic material from which the liners are obtained are deposited on disk-like bodies that are conveyed through the various carousels, where the doses are subjected to the molding operations. Hereinafter, for the sake of convenience in description, these bodies are termed shuttles.

The apparatus is completed by a series of four substantially star-shaped elements that can rotate about vertical axes and are provided peripherally with equidistant semicircular recesses that form seats suitable to accommodate said shuttles. Said elements are designated hereinafter as transfer stars. A first star transfers the shuttles from the dosage carousel to the molding carousel, a second star performs transfer from the molding carousel to the insertion carousel, a third star transfers the shuttles from the insertion carousel to the dosage carousel, and a fourth star transfers the caps onto a removal conveyor.

The apparatus thus described has considerable drawbacks caused by the fact that the shuttles, along the regions for transfer from the carousels onto the transfer elements and vice versa, slide on supporting surfaces, undergoing wear and wearing said surfaces.

Another drawback of the known apparatus is its constructive complexity, which is linked to the presence of four shuttle transfer stars. Other drawbacks cause functional limitations that hinder operation of the apparatus at particularly high production rates.

These limitations are due to the fact that the increase in the rotation rate of the various components of the apparatus entails an increase in the centrifugal actions affecting the doses of plastic material deposited on the shuttles; accordingly, these doses are induced to shift radially outward and to escape from the hollows of the shuttles, thus compromising the molding of the liners.

SUMMARY OF THE INVENTION

The technical aim of the present invention is to provide an apparatus for molding and applying liners in caps that is capable of transferring the shuttles from one carousel to the other without appreciable friction of the shuttles and of the sliding tracks, so as to improve and extend the efficiency of the apparatus.

Within the scope of this aim, an object of the present invention is to provide an apparatus that uses only three stars interposed between the carousels.

Another object of the present invention is to provide an apparatus in which the doses of plastic material are firmly retained on the shuttles.

Another object of the present invention is to provide an apparatus that is capable of providing effective and easy removal of the plastic liners from the shuttles and of inserting them in the caps.

This aim and these objects are achieved with an apparatus for molding and inserting plastic liners in caps, whose characteristics are defined in the claims.

BRIEF DESCRIPTION OF THE DRAWINGS

Further particularities will become apparent and evident from the detailed description of a preferred but not exclusive embodiment of an apparatus for applying liners in caps according to the invention, illustrated only by way of non-limitative example in the accompanying drawings, wherein:

FIG. 16 is a schematic view of another embodiment yet of the retention means;

FIG. 17 is a sectional view, taken along the plane XVII—XVII of FIG. 16.

DESCRIPTION OF THE PREFERRED EMBODIMENTS

Figure 1:
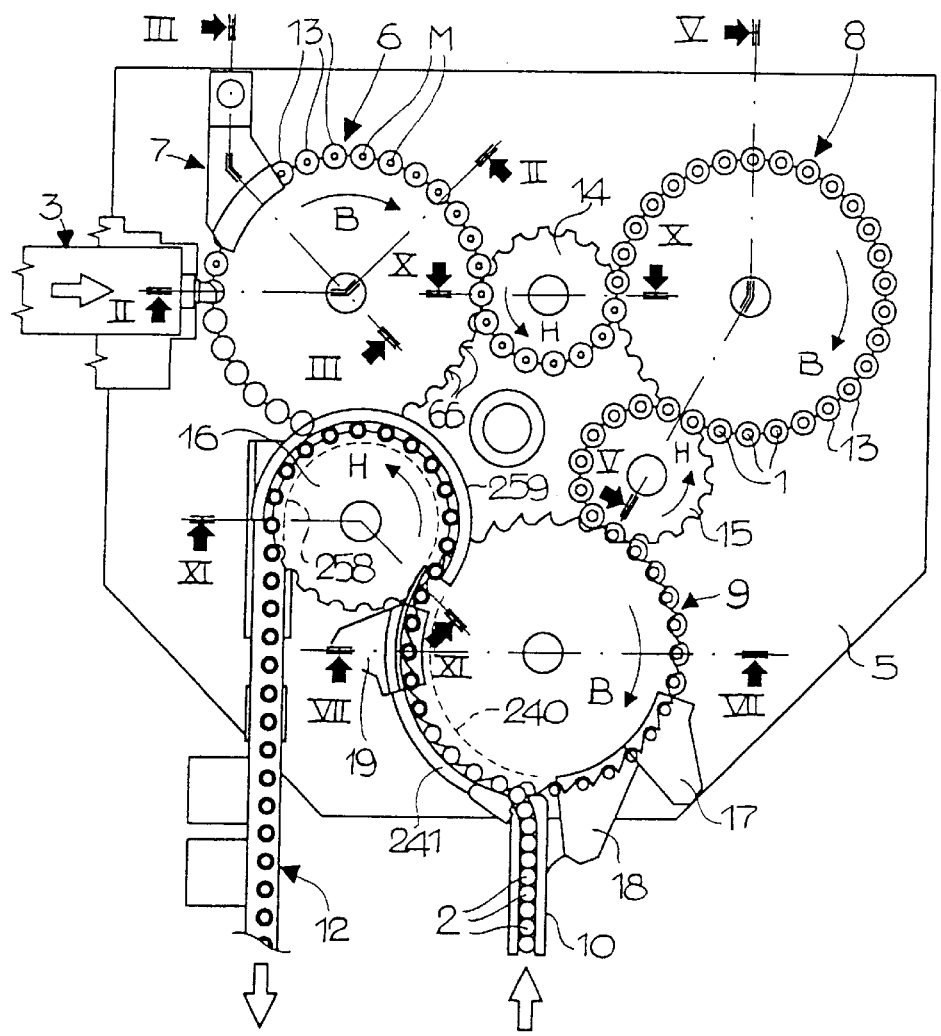
FIG. 1 is a plan view of the apparatus.

With particular reference to the above figures, an apparatus for molding and inserting liners 1 in caps 2 is shown schematically in top view. For the sake of illustration, in the example illustrated and described hereinafter it is assumed that the caps are constituted by screw closures composed of a cylindrical cup that is threaded internally and is suitable to receive, on its bottom, a disk-like liner, for example for closing containers or jars. The plastic material, meant to assume the shape of a disk-like liner, is dispensed by an extruder 3 provided with a vertical nozzle 4, from which the plastic material in the pasty state exits upward (see FIG. 2). The apparatus comprises a footing 5 for supporting a dosage carousel 6, with which a device 7 for recovering plastic material when the apparatus starts is associated, a molding carousel 8, and an insertion carousel 9, with vertical axes that are arranged, in plan view, at the corners of an equilateral triangle. The reference numerals 10 and 12 designate a feeder 10 for caps 2 and a conveyor 12 for removing the completed caps, i.e., the caps provided with a liner, from the apparatus. The plastic material is picked up by means with which the dosage carousel 6 is provided and is deposited in doses M on disk-like bodies 13 which, like shuttles, travel peripherally along the carousels 6, 8 and 9. The footing 5 furthermore supports a first star 14 for transferring the shuttles 13 from the dosage carousel 6 to the molding carousel 8, a second star 15 for transferring the shuttles from the molding carousel 8 to the insertion carousel 9, and a third star 16, which is suitable to simultaneously convey the caps 2 onto the removal conveyor 12 and to transfer the shuttles 13, without the liners 1, into the dosage carousel 6 to load them again with doses M of plastic material. The apparatus is completed by a device 18 for cleaning the shuttles of waste produced by imperfect molding of the liners, by a device 18 for discarding said waste, and by a device 19 for rejecting liners without caps, which is suitable to eliminate the liners that have not been seated in said caps.

Figure 3:
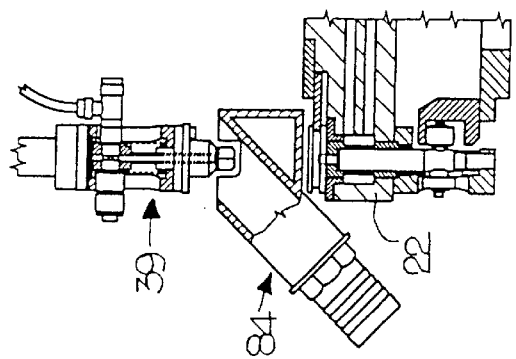
FIG. 3 is a partial sectional view of the dosage carousel, taken along the plane III—III of FIG. 1.
Figure 2:
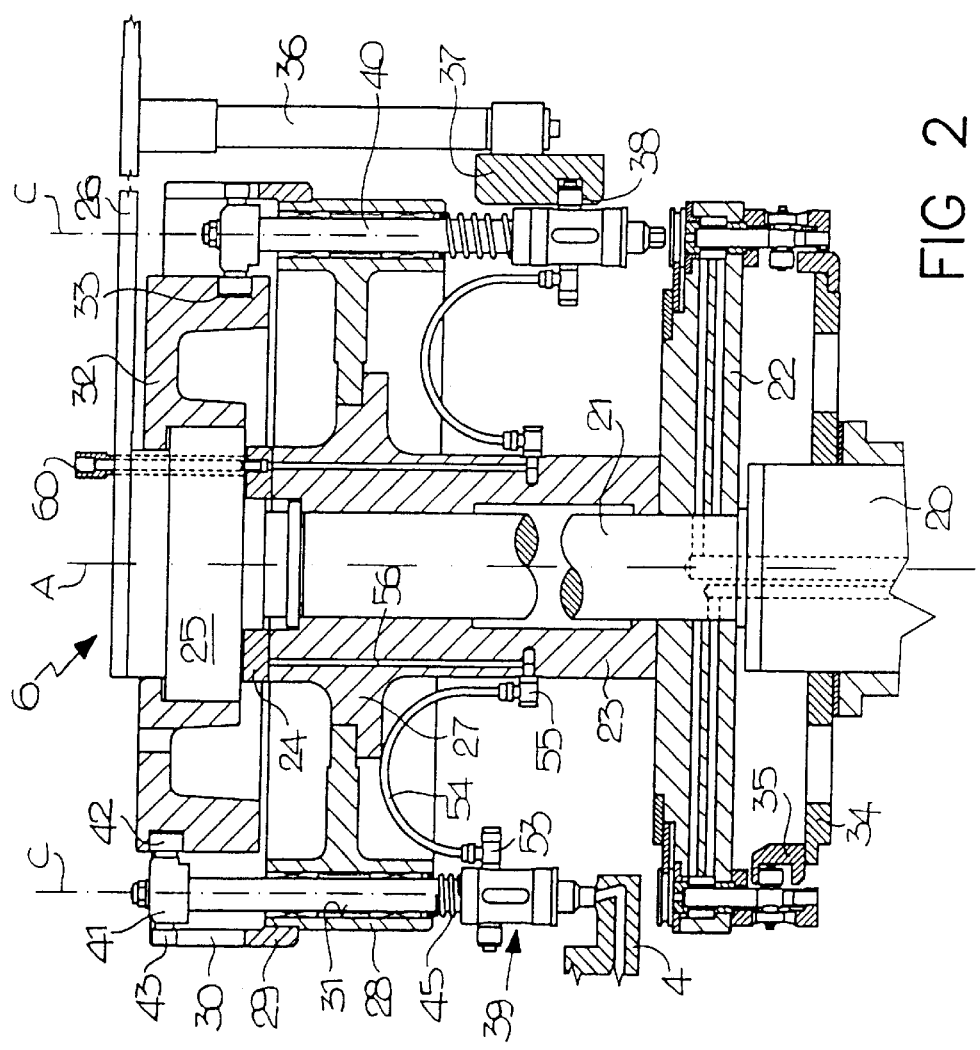
FIG. 2 is a sectional view of the dosage carousel, taken along the plane II—II of FIG. 1.
Figure 4:
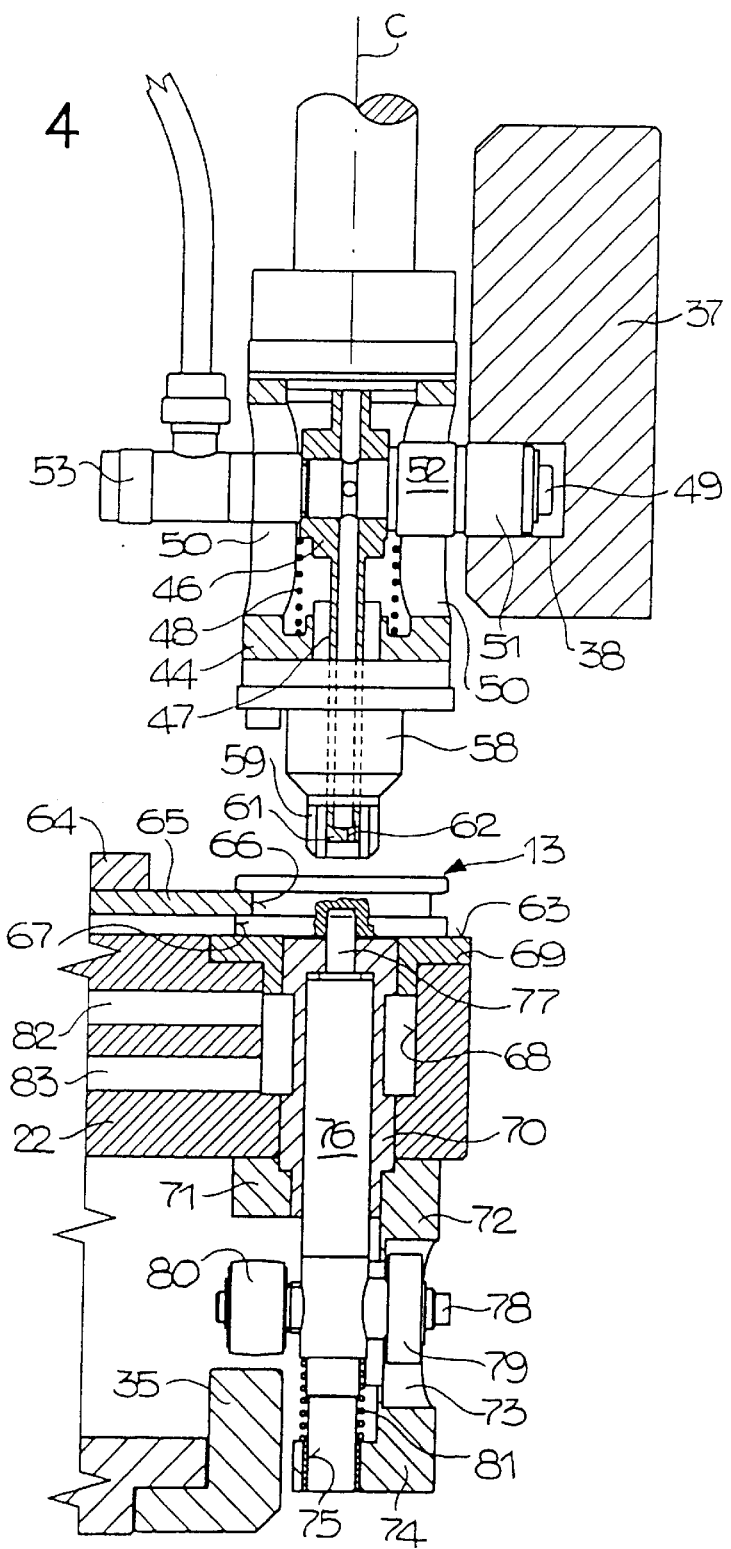
FIG. 4 is an enlarged-scale view of a detail of FIG. 2.

The dosage carousel 6, shown in FIGS. 2 to 4, comprises a tube 20, which rises from the footing 5 and to which a shaft 21 is rigidly coupled and is supported so that it can rotate therein about the vertical axis A; said shaft is turned in the clockwise direction B by transmission elements, not shown in the drawings. A circular plate 22 and a tubular element 23 are keyed on the shaft 21, and said tubular element is surmounted, by interposing a distribution coupling 24, by a box 25 that contains a bearing for supporting the shaft 21 and is rigidly coupled to the footing 5 by means of a frame 26. The tubular element 23 is provided with an outer annular protrusion 27, which forms a support for a rotating drum 28 that is flanged thereon, on the upper edge of which an annular element 29 is rigidly coupled; multiple vertical slots 30 are formed in said annular element. The drum 28 has multiple holes 31 whose axes C are parallel and arranged concentrically around the axis A and are angularly equidistant. A flange 32 is centered and fixed on the box 25, and a cylindrical portion, provided with an annular slot that forms an axial cam 33, descends from the edge of said flange. A circular plate 34 is furthermore rigidly coupled to the tube 20 and an axial stationary cam 35 is fixed to the peripheral region of said plate. Multiple uprights 36 extend downward from the frame 26 and support an annular segment 37 that is concentric to the shaft 21 and has, on its inner side, a slot that forms an axial cam 38.

The holes 31 of the drum 28 support assemblies for dosing the plastic material, each assembly being generally designated by the reference numeral 39. Each assembly 39 comprises a cylindrical column 40, which can slide in the respective hole 31 and has, in an upward region, a head 41 that supports rotatably, in diametrically opposite positions, an inner roller 42 and an outer roller 43, which respectively engage the cam 33 and the vertical slot 30 of the annular element 29. A cylindrical case 44 is locked at the lower end of the column 40 and is surmounted by a vertical spring 45, which engages under the drum 28. A piston 46 can slide in the cavity of the case 44, is provided with a cannula 47 and is actuated upward by a spring 48. A hollow pivot 49 is diametrically rigidly coupled to the piston 46 and can move within vertical slots 50 of the case 44. The pivot 49 rotatably supports, at one end, two rollers 51 and 52 that engage respectively the cam 38 and the outermost slot 50. The hollow pivot 49 connects the cannula 47 to a connector 53 and, by way of a flexible hose 54 and an additional connector 55, to a duct 56 formed within the thickness of the tubular element 23. The case 44 ends in a downward region with a hollow tang 58, which is provided with a substantially semicylindrical element that is internally hollow, is open in the direction B of the rotation of the carousel and forms a bowl 59 for collecting a dose of plastic material from the outlet of the nozzle 4 of the extruder 3. During the rotation of the carousel, the ducts 56, by way of the distribution coupling 24, are cyclically connected to a manifold 60, which is connected to a source of compressed air so as to expel from the bowl 59 the collected dose of plastic material. Conveniently, the cannula 47 ends in a downward region with a plate 61 that is crossed by an opening 62, so that the expulsion of the dose produced by the compressed air is associated with the mechanical action of the plate 61, obtained by actuating the descent of the piston 46 with the cam 38.

The circular plate 22 has a perimetric region 63 in which a ring 65 is centered and locked by means of a center bearing 64; said ring is provided peripherally with semicircular recesses 66 that are angularly equidistant, so that the ring 65 assumes a star-like configuration in which the recesses 66 and the peripheral region 63 of the plate form seats that are suitable to receive the shuttles 13. Said seats are designated hereinafter by the same reference numeral 66 as the recesses for the sake of convenience in description. More particularly, the ring 65 is raised with respect to the surface of the perimetric region 63, so that under the edges of the recesses 66 there are undercuts 67 suitable to receive a retention collar with which the shuttles 13 are provided, as will become apparent hereinafter.

The plate 22 is provided peripherally with a plurality of cylindrical seats 68, which are coaxial to the axis C of the columns 40 and in which means for locking the shuttles 13 in the seats 66 are arranged. Said means comprise a bush 69, which is inserted in the seat 68 flush with the perimetric region 63, and a sleeve 70 that is inserted, in an upward region, in the bush 69 and, in a downward region, in the rib 71 of an annular body 72 that is fixed under the plate 22 and has a substantially C-shaped cross-section. The body 72 comprises a cylindrical wall in which there are multiple vertical slots 73 and an inner annular lip 74 in which there are multiple through holes 75 that are aligned with the sleeves 70. A spindle 76 is slidingly engaged in each sleeve 70 and has a lower end that is guided in the lower hole 75 and an upper end that is provided with a pin 77 that is suitable to protrude from the region 63.

The spindle 76 furthermore has, in its intermediate portion, a pivot 78 that passes through it diametrically and supports a roller 79 at the outer end and a roller 80 at the inner end. The outer roller 79 is engaged in the respective vertical slot 73, while the inner roller 80 can slide on the stationary cam 35. A spring 81 is applied to the spindle 76 and abuts with one end on a shoulder provided on said spindle and with another end on the annular lip 74.

The plate 22 is also provided with a circuit, composed of radial delivery ducts 82 and radial discharge ducts 83, that is suitable to convey a fluid at a preset temperature into the seats 68, so that the bushes 69 and the shuttles 13 with which they will make contact during the rotation of the dosage carousel 6 are kept at an optimum temperature for the doses M of plastic material before their transfer onto the molding carousel. It should be noted that the imperfect doses that may form before the apparatus reaches the steady-state temperature can be eliminated by means of the recovery device 7, which for this purpose is constituted by a discharge outlet 84 that is connected to paths for the discharge and recycling of the plastic material.

In order to allow the shuttles 13 to be positioned and retained in the seats 66 of the dosage carousel 6 and, as will become apparent hereinafter, of the molding carousel 8 and the insertion carousel 9, each shuttle 13 is constituted (see FIG. 9 in particular) by a circular plate on the lateral surface of which there is an annular slot 85, which forms an upper collar 86 and a lower collar 87. Moreover, a groove 88 is formed in the face of the lower collar 87 that is directed toward the upper collar and gives the collar 87 a cross-section that increases radially outward. The shuttle 13 has a hole 89 in a downward region and a circular depression 90 in a downward region, said hole and said depression being mutually coaxial. A cup 91 is placed in the depression 90 and contains a pad 92, whose properties allow the dose M of plastic material in the pasty state, taken at the outlet of the extruder by virtue of the rotation of the bowls 59, to remain attached to it and thus retain the dose in a centered position on the shuttle. The pad 92 is monolithically recessed in the cup 91, which is fixed in the depression 90 by a plurality of screws 93. The cup 91 furthermore has, in a downward region, a central hollow 94 that is connected to a gap 95 that lies between the cylindrical walls of the cup 91 and of the depression 90 and leads onto the upper face of the shuttle 13, where it forms an annular opening.

Figure 5:
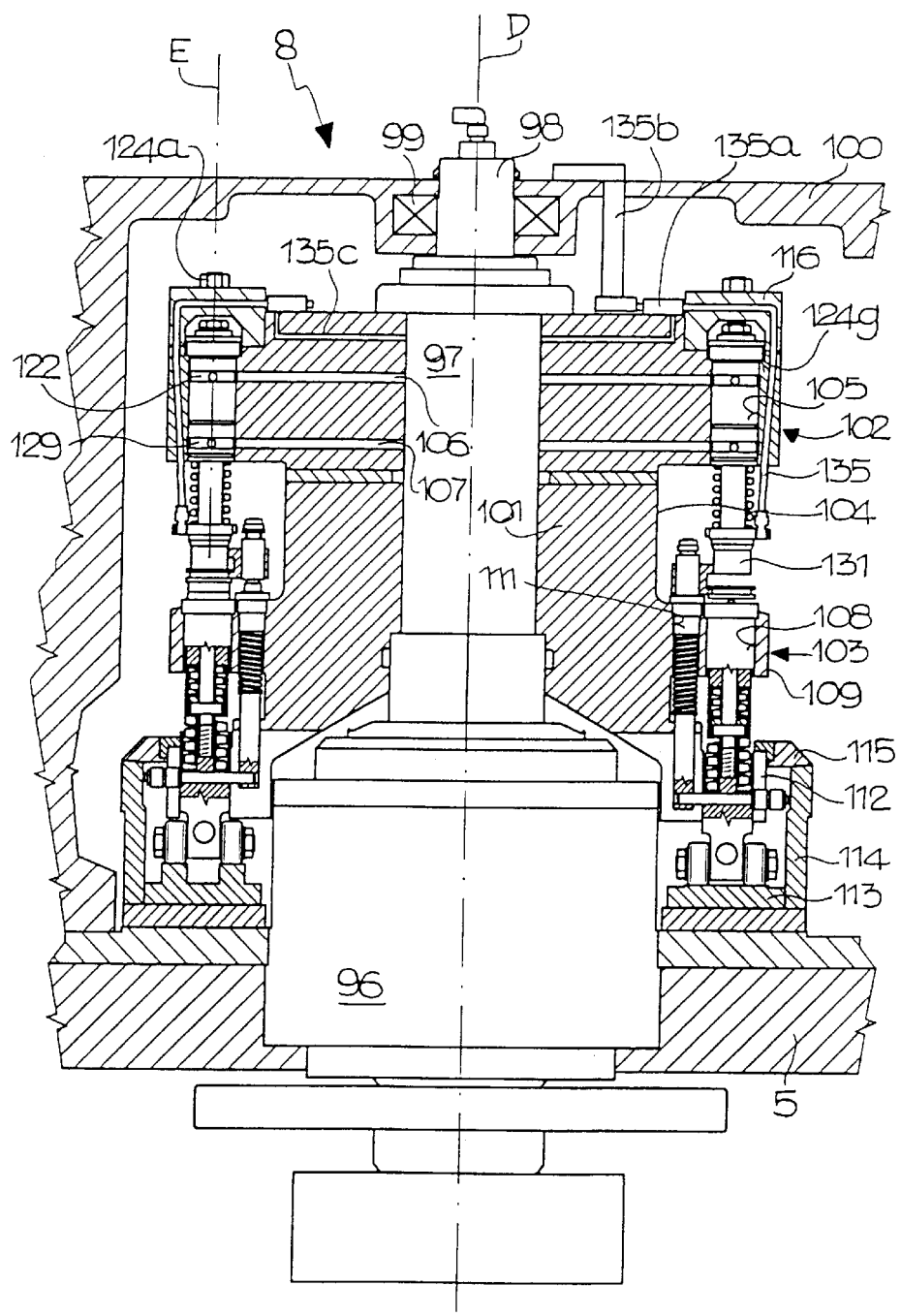
FIG. 5 is a sectional view of the molding carousel, taken along the plane V—V of FIG. 1.
Figure 6:
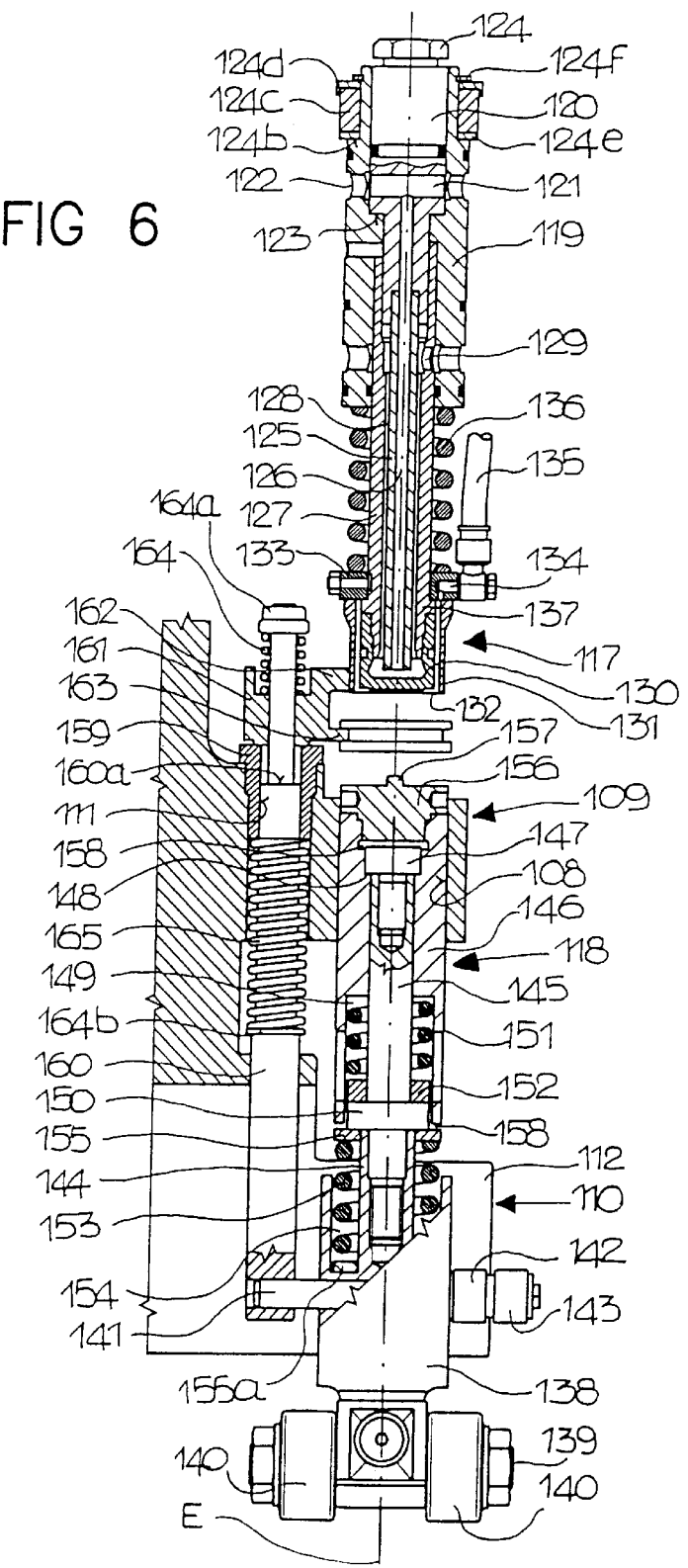
FIG. 6 is an enlarged-scale view of a molding assembly of the molding carousel of FIG. 5.

The molding carousel 8, shown in FIGS. 5 and 6, comprises a cylindrical body 96, which is rigidly coupled to the footing 5 and in which a vertical shaft 97 is rotatably supported; said shaft has an axis D and is actuated so as to rotate in the clockwise direction B by transmission elements that are not shown in the drawings. The top end 98 of the shaft 97 is supported, by means of a bearing 99; by a structure 100 that rises from the footing 5. A drum 101 is keyed on the vertical shaft 97 and has an upper annular portion 102 and a lower annular portion 103, between which an annular recess 104 remains. The upper annular portion 102 has a plurality of cylindrical through seats 105, whose axis E is parallel to the rotation axis D. The seats 105 are concentric to the axis D and are angularly equidistant.

In the upper annular portion 102 there are multiple upper channels 106 and lower channels 107 that run radially and connect the respective cylindrical seats 105 to a source of cooling fluid. Coaxially to the seats 105, in the lower annular portion 103, there is another plurality of cylindrical seats 108.

The lower portion 103 has an annular cavity that divides said portion into two superimposed collars 109, 110, both of which are crossed by the seats 108. A respective additional cylindrical seat 111 (see also FIG. 6) is formed in the upper collar 109, radially inward with respect to each cylindrical seat 108 and parallel thereto.

Multiple vertical slits 112 arranged in a radial pattern are provided in the lower collar 110, and their central planes contain the axes of the corresponding cylindrical seats 108, 111. An axial cam 113 makes contact underneath the drum 101 on the footing 5, is concentric to the axis D and comprises two vertically arranged concentric profiled elements. The cam 113 and the lower collar 110 are protected by a cylindrical case 114 whose upper edge 115 skims the outer edge of the collar 110.

Each one of the upper cylindrical seats 105 is closed in an upward region by an L-shaped body 116, and a male mold part, generally designated by the reference numeral 117, is accommodated in said seats; together with a respective complementary male mold part 118 accommodated in the seats 108, said male mold part composes one of the liner molding assemblies. The male mold part 117 of each molding assembly is composed of a sleeve 119, which is permanently inserted in the seat 105 and is closed in an upward region by a cylindrical head 120 that is hermetically and slidingly inserted therein and is provided with a diametrical hole 121 which is connected, by means of holes 122 of the sleeve 119, to a respective channel 106. The head 120 has a step for resting on a shoulder 123 of the sleeve 119, and a screw 124 is screwed into its top end; a screw 124a acts on said screw 124, has an axis E (see FIG. 5) and is screwed through the L-shaped body 116. The upper end portion of the sleeve 119 has an outer step 124b, on which a ring of rubber-like material 124c rests, said ring being compressed between two metallic center bearings 124d, 124e and being retained by an elastic ring 124f. The ring 124e rests on a shoulder 124g of the seat 105. In this manner, by acting on the screw 124a it is possible to preload the ring 124c against the shoulder 124g and therefore the male mold part 117. The head 120 has a tubular extension to which a cannula 125 is connected; said cannula forms a channel 126, which is connected to the diametrical hole 121. The cannula 125 lies inside a tubular stem 127 and forms, with said stem, an interspace 128 which is connected, by virtue of holes 129 of the tubular stem and of the sleeve, to a respective radial channel 107. At the lower end, the tubular stem 127 is closed by a cup-like element 130, which connects the interspace 128 to the channel 126. The cup 130, whose bottom constitutes the actual male mold part, is accommodated in a bush 131 whose inside diameter is larger than the outside diameter of the cup, so that an annular gap 132 is formed between them. The bush 131 is rigidly coupled to a ring 133 that can slide on the stem 127 and in which there is a passage 134 that connects the gap 132 to a flexible hose 135 for delivering compressed air. Each flexible hose 135 is connected to a respective valve 135a that is actuated cyclically as the carousel rotates by an abutment 135b that is fixed to the structure 100. The valve cyclically connects the hose 135 to a duct 135c for feeding compressed air. The ring 133, by means of a spring 136 interposed between it and the sleeve 119, is actuated so as to rest against a shoulder 137 of the tubular stem 127. Conveniently, the length of the bush 131 is such that in the position in which it rests on the shoulder 137 its lower edge extends below the cup 130. Moreover, the diameter of the bush 131 is smaller than the outside diameter of the shuttle 13 but greater than the diameter of the depression 90.

The complementary male mold part 118 comprises a stem 138 that is crossed by a radial pivot 139, which supports two free rollers 140 that engage by rolling thereon the pair of profiles of the cam 113 fixed to the footing 5. A pin 141 is driven through the stem 138 and rotatably supports an additional upper pair of rollers 142 and 143. Both rollers are arranged at the end of the pin, which with respect to the axis E lies outside the stem 138. The roller 142 engages the vertical slit 112 of the collar 110, while the roller 143 can engage a sector that is fixed inside the cylindrical case 114. The stem 138 contains a threaded bushing 144, in which the threaded end of a cylindrical spindle 145 is screwed, said spindle being mounted so that it can slide in a tubular tang 146, to the top of which a screw 147 is screwed whose head has a larger diameter than the spindle sliding hole so as to be able to abut against a shoulder 148 of the tubular tang 146. A hollow 149 is formed in said tubular tang and accommodates a ring 150 that is monolithic with the spindle 145 and a spring 151 that acts between the tang 146 and the ring 150 with a spacing center bearing 152 interposed, so as to actuate the head of the screw 147 into abutment against the shoulder 148.

An additional spring 153 is accommodated in a hollow 154 of the stem 138 that surrounds the bushing 144 in order to act, with a center bearing 155 interposed, against the lower edge of the tang 146 and acts as a support for the ring 150. The spring 153 rests on the bottom of the hollow 154 with a spacer ring 155a. The rings 151 and 155a allow to adjust the preloading of the springs 151, 153. At the top end of the tubular tang 146 there is a seat in which a shuttle holder insert 156 is screwed; said insert is provided with a central pivot 157 that is suitable to engage in the central hole 89 of the shuttle 13. Between the insert 156 and the head of the screw 147 there remains an interspace 158, which allows the spindle 145 to perform a short stroke with respect to the tang 146 in contrast with the return action applied by the spring 151. When the head of the screw 147 rests on the shoulder 148, between the center bearing 155 and the lower edge of the tubular tang 146 there is an interspace 158a that is not as high as the interspace 158.

A bush 159 is fixed in each one of the cylindrical seats 111, and a rod 160 can slide therein; the pin 141 is inserted into said rod in a downward region. The rod 160 has an upper portion that has a smaller diameter and forms an abutment 160a, inside the bush 159, which protrudes out of the bush 159. A block 161 is slidingly fixed on said portion, and two superimposed forks 162, 163 protrude from it; their prongs form two semicircular curves, the upper one being suitable to receive the bush 131 and the lower one being suitable to receive the slot 85 of the shuttle. The numeral 164 designates a spring that is interposed between the block 161 and a nut 164a, which is screwed onto the end of the rod 160. The spring 164 is meant to actuate the block 161 downward in order to keep it rested on the abutment 160a when the rod 160 is actuated upward by the cam 113 together with the stem 138. A washer 164b is arranged on the rod 160, and a spring 165 rests on said washer and abuts against the edge of the bush 159 that guides the rod 160.

Figure 7:
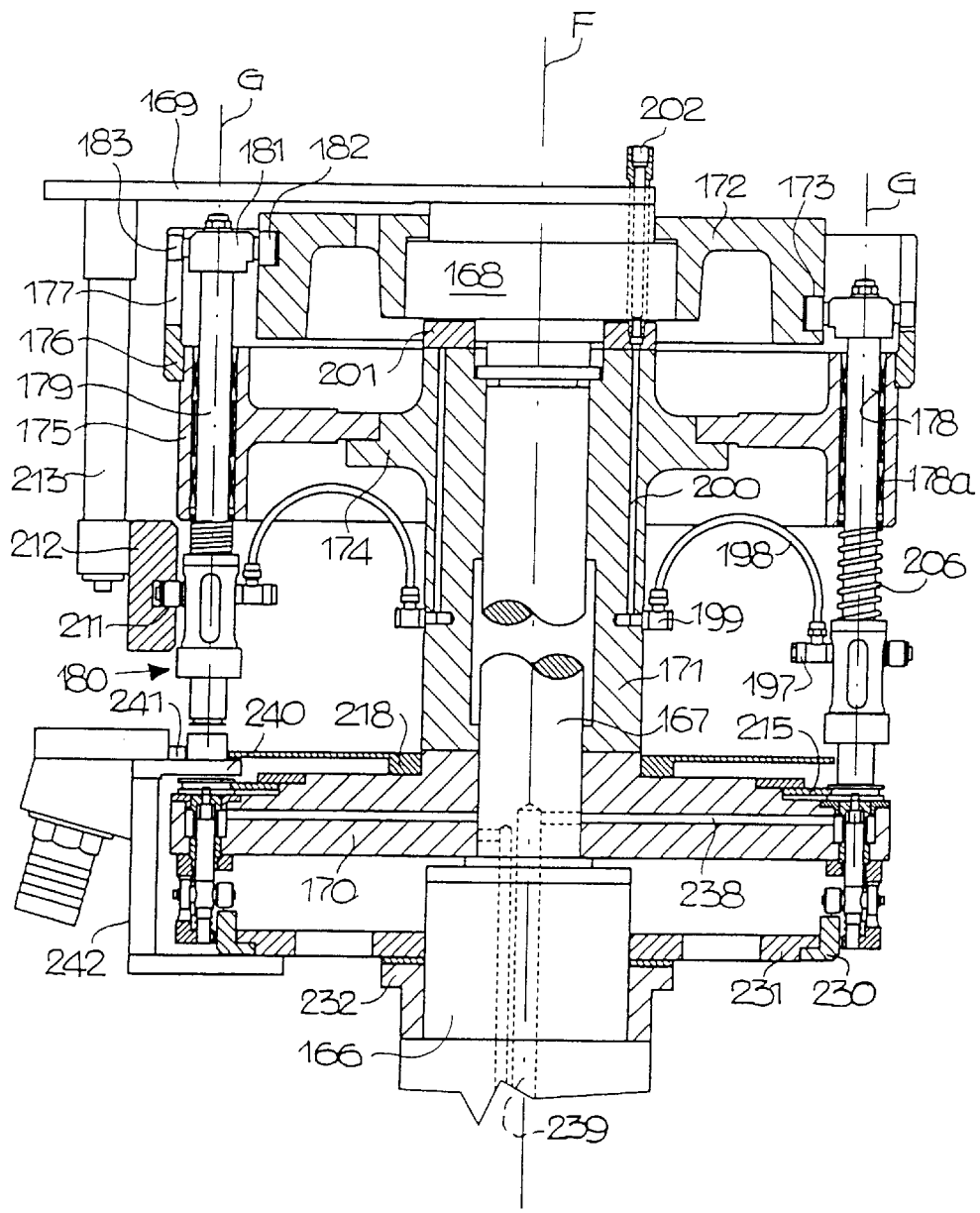
FIG. 7 is a sectional view of the insertion carousel, taken along the plane VII—VII of FIG. 1.
Figure 8:
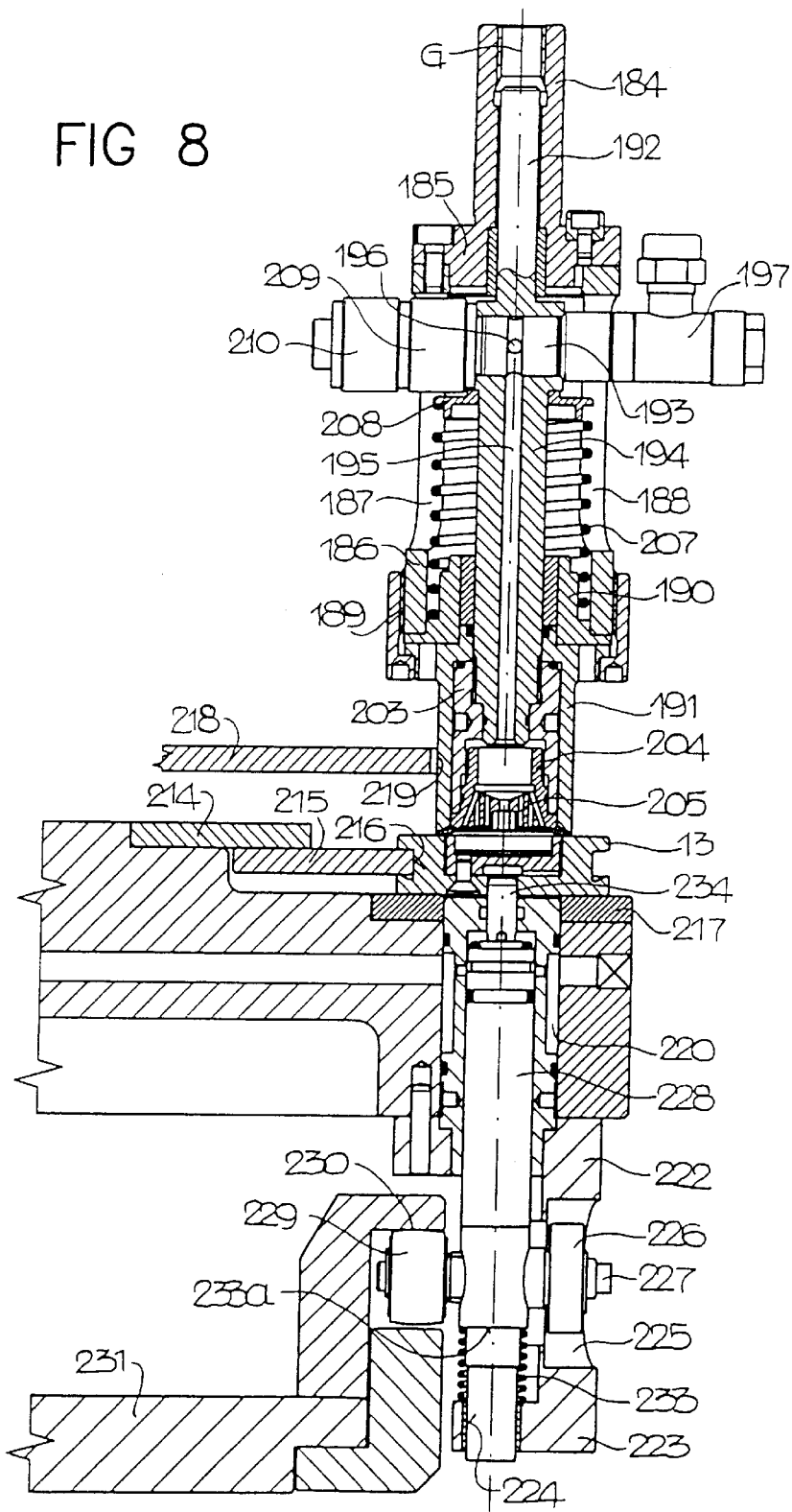
FIG. 8 is an enlarged-scale view of a detail of FIG. 7.
Figure 9:
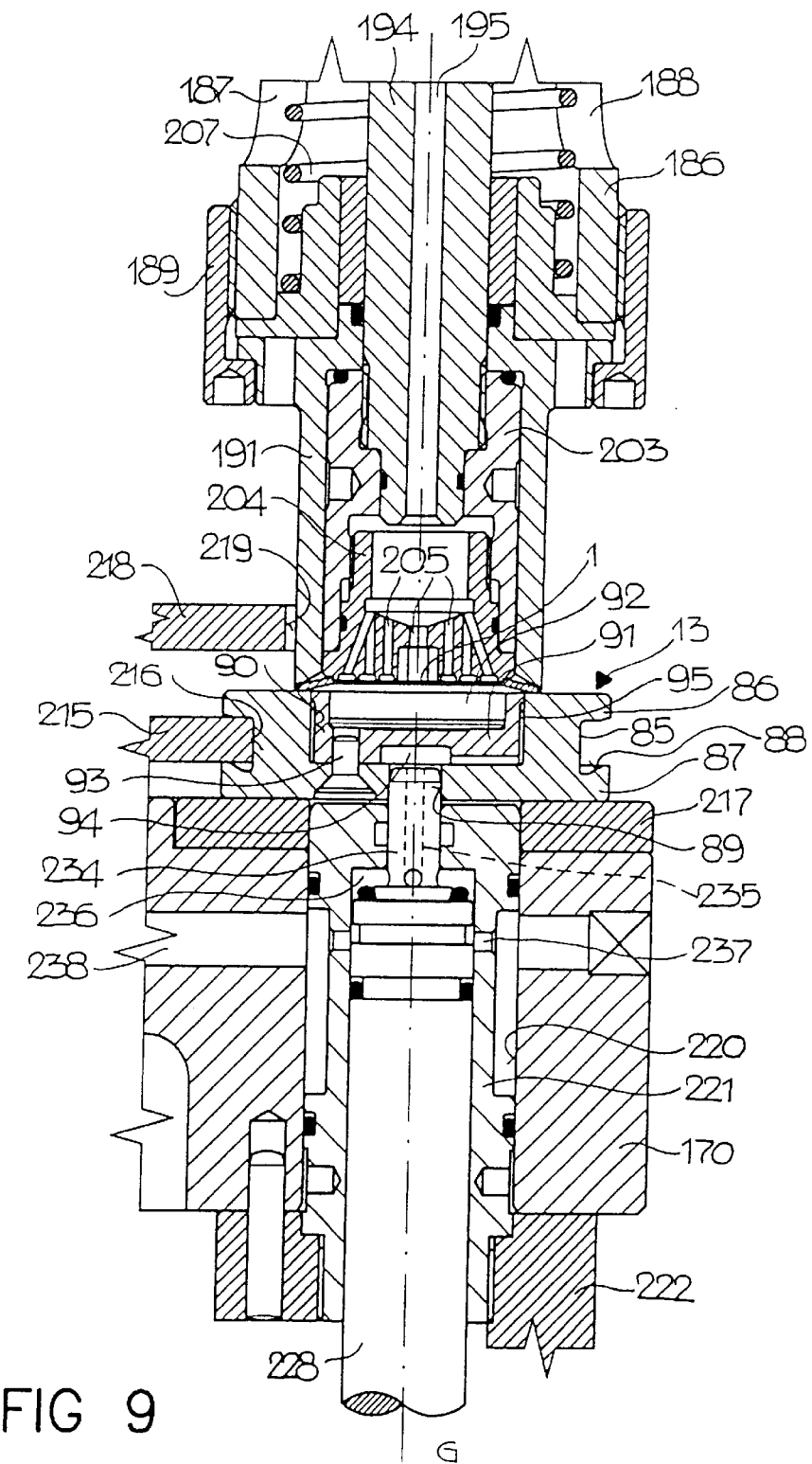
FIG. 9 is an enlarged-scale view of a detail of FIG. 8.

The insertion carousel 9 is shown in FIGS. 7 to 9 and like the other carousels comprises a tubular box 166, which is mounted on the footing 5 and in which a vertical shaft 167 is rotatably supported; said shaft has an axis F and is actuated by transmission elements, not shown in the drawings, in the clockwise direction B. The upper end of the shaft can rotate in a support 168, which is supported by a structure 169 mounted on the footing 5. A circular plate 170 and a tubular element 171 are keyed on the shaft 167. A flange 172 is centered and fixed on the support 168, and a cylindrical portion protrudes downward from the peripheral region of said flange and is provided with a slot that forms an axial cam 173. The tubular element 171 has an annular raised portion 174 for fixing a drum 175, from the upper edge of which there rises a ring 176 provided with multiple vertical slots 177 that are angularly equidistant.

Multiple seats 178 are formed in the drum 175, and multiple respective columns 179 are guided therein by means of bearings 178a; said columns have a vertical axis G and are arranged concentrically around the central axis F. The columns 179 support assemblies 180 for picking up and inserting the liners 1 in the caps 2. The upper ends of the columns 179 protrude from the seats 178, and respective supports 181 are fixed thereon. Two free rollers 182, 183 cantilever out from each support 181; the first one engages on the cam 173 and the second one engages in the slot 177, so as to actuate the vertical movements of the respective column 179.

A tubular element 184 (see FIG. 8) is rigidly coupled to each column 179 at the lower end and is provided with a plate 185, with which a cylindrical case 186 is associated; said case has two longitudinal and diametrical opposite slots 187, 188. The lower end of the case 186 is threaded externally, and a ring 189 is screwed thereon; said ring clamps, against the edge of the case 186, two flanges of, respectively, a bush 190 and a sleeve 191 that are extended respectively inside and outside the case 186. The sleeve 191 is conveniently provided with an internally beveled edge, which has a larger diameter than the depression 90 of the shuttles 13.

A stem 192 is guided in the tubular element 184 and in the bush 190 and is crossed diametrically by a hollow tang 193 that passes through the slots 187, 188. The stem 192 comprises a portion 194 that protrudes below the tang 193 and is crossed by an axial duct 195 that is connected to a flexible hose 198 (see FIG. 7) by means of passages 196 formed in the tang 193 and a connector 197 associated therewith.

The flexible hose 198, by means of a connector 199, is connected to a channel 200 that runs through the tubular element 171 and the support 168. The channel 200 extends axially upward to be connected cyclically, by virtue of a distribution unit 201 that is rotationally rigidly coupled to the support 168, to a coupling 202 of a suction pump.

A nipple 203 is slidingly accommodated in the sleeve 191, is screwed onto the lower end of the tubular portion 194 and has a cavity in which a nozzle 204 is screwed; said nozzle is provided with a plurality of through holes 205 that are connected to the duct 195 and thus to the suction pump.

A spring 206 acts between the case 186 and the drum 175, while an additional spring 207 is accommodated inside the case 186 and acts between the bush 190 and a washer 208 that rests on a shoulder of the portion 194 of the stem 192.

Two free rollers 209 and 210 are mounted on the tang 193, on the opposite side with respect to the connector 197. The roller 209 is guided in the slot 187, while the roller 210 is suitable to engage in a slot 211 formed in an annular sector 212 that lies concentrically to the axis F and is rigidly coupled by uprights 213 to the structure 169.

The slot 211 constitutes an axial cam that actuates the movements of the stem 192 and accordingly of the perforated nozzle 204 with respect to the case 186.

The plate 170 has a structure that is similar to the structure of the plate 22 of the dosage carousel 7. Said plate in fact has an annular perimetric region on which a center bearing 214 is centered and locked (see FIG. 8) for the coupling of a ring 215 that is provided peripherally with semicircular recesses 216 that are angularly equidistant and are superimposed on a sliding track 217 for the shuttles 13. The recesses 216 give the ring 215 a star-like shape, in which the recesses 216 and the track 217 form seats for accommodating the shuttles 13. The shuttles 13 remain positioned in the seats by virtue of the engagement of the edges of the recesses 216 in the slot 85 of the shuttles.

A disk 218 is centered and rotationally rigidly coupled above the plate 170 and is provided peripherally with a plurality of semicircular recesses 219, each of which is superimposed coaxially on a respective seat 216 of the ring 215 and has a diameter that is complementary to the outside diameter of the respective sleeve 191.

The plate 170 is provided peripherally with a plurality of cylindrical seats 220 that are coaxial to the axis G; a cylindrical jacket 221 is inserted in each one of said seats and engages, in a downward region, an annular body 222 that is fixed under the plate 170. The annular body 222 has a C-shaped cross-section, with a cylindrical wall from which an annular lip 223 protrudes inward; multiple through holes 224 are formed in said lip and are aligned with the seats 220 of the plate 170. Respective vertical slots 225 are formed in the cylindrical wall of the body 222, at the holes 224, and the rollers 226 slide therein.

Each roller 226 is mounted freely on a respective pivot 227, which passes diametrically through a spindle 228 that is guided hermetically in the cylindrical jacket 221 and in the hole 224. A second roller 229 is also mounted on the pivot 227, in a diametrically opposite position with respect to the roller 226, and is controlled by a stationary cam 230 that runs along the peripheral region of a circular plate 231 that is fixed to a shoulder 232 of the box 166.

The spindle 228 is actuated upward by a spring 233 that is interposed between the lip 223 and an annular abutment 233a, and has an upper end from which there protrudes axially a pin 234 that is suitable to engage in the hole 89 of the shuttles 13.

The pin 234 is crossed axially by a hole 235, which is connected, by means of radial passages, to a chamber 236 formed by the top of the spindle 228 inside the jacket 221. The chamber 236 is connected, by means of a passage formed between the jacket 221 and the spindle 228, radial holes 237 of the jacket 221 and a radial channel 238 of the plate 170, to a source of compressed air fed by channels 239, which are formed in the shaft 167. The compressed air delivery can be controlled by a ring 239a made of rubber-like material, which in the raised position of the spindle abuts against the top of the chamber 236, blocking the flow of air between the radial channel 238 and the hole 235. Each spindle 228, under the actuation of the cam 230, performs strokes between a raised position, in which the pin 234 engages the hole 89 of the respective shuttle 13, and a lower position for disengaging from the hole 89, in order to allow the shuttle 13 to disengage from the recess 216 of the star 215.

As shown more clearly in FIG. 1, the plate 170, in the circular portion that lies between the feeder 10 and the transfer star 16, is surmounted peripherally by a flat circular sector 240 that is concentric to the axis F and on which an external side wall 241 is fixed. The caps 2 that arrive from the feeder 10 and are moved by the star 218, whose recesses 219 they engage, are meant to slide on the sector 240. The sector 240 is supported by uprights 242, which are rigidly coupled to the plate 231.

Moving on to describe the structure of the stars 14, 15 and 16 that transfer the shuttles 13 from one carousel to the next, it is noted that since the stars 14 and 15 only have to transfer the shuttles 13 they are constructively identical.

Figure 10:
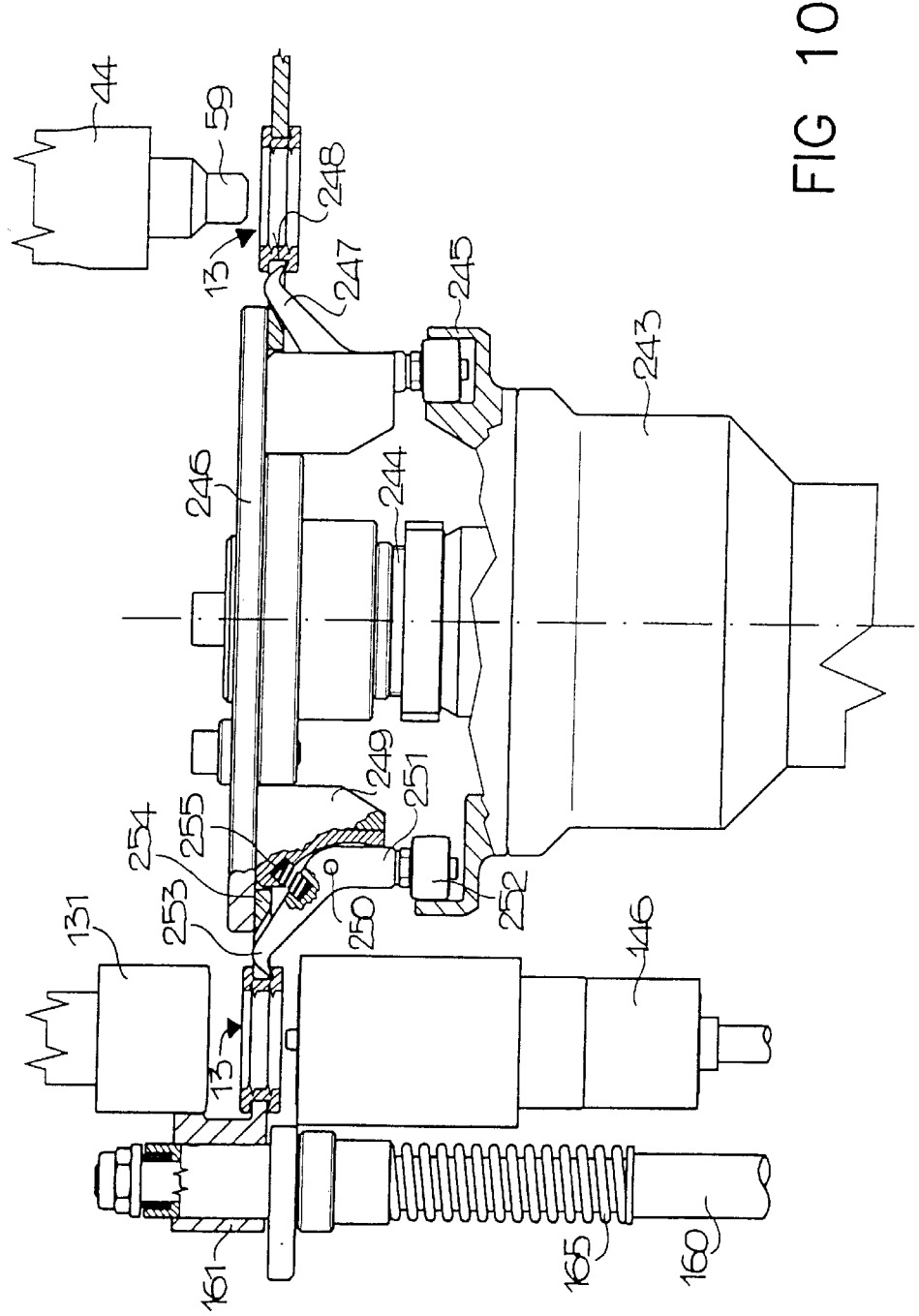
FIG. 10 is a transverse sectional view of the first star, taken along the plane X—X of FIG. 1.

The first transfer star 14, shown in FIG. 10, and the second star 15 comprise a cylindrical box 243 that is substantially cup-shaped and is rigidly coupled to the footing 5 and in which a vertical driving shaft 244 is rotatably supported; said shaft is actuated by transmission elements that are not shown in the drawings. The box 243 has, on its upper edge, an annular side wall that constitutes a radial actuation cam 245. A flange 246 is keyed to the driving shaft 244, and a flat ring 247 is peripherally rigidly coupled to said flange and is provided with multiple semicircular recesses 248 that form seats for the shuttles 13. The recesses 248 give the ring 247 a star-like shape whose edges are suitable to engage in the annular slot 85 of the shuttles 13 in order to support them during their transfer from one carousel to the next. A block 249 is fixed under the flange 246, at each recess 248, and a lever 251 is articulated in a rocker-like fashion in said block by means of a pivot 250. The levers 251 are L-shaped and comprise a lower arm, which supports a free roller 252, and an upper arm, which ends with a claw 253 constituting a retention element that is curved downward.

The roller 252 engages the cam 245 by rolling thereon, and the claw 253 is inserted in a radial slit 254 of the ring 247. The reference numeral 255 designates springs that act on the levers 251 so as to actuate the claws 253 outward and downward, in order to be able to move them into engagement on the lower collars 87 of the shuttles 13, so as to retain them in the recesses 248 of the rings 247.

Figure 11:
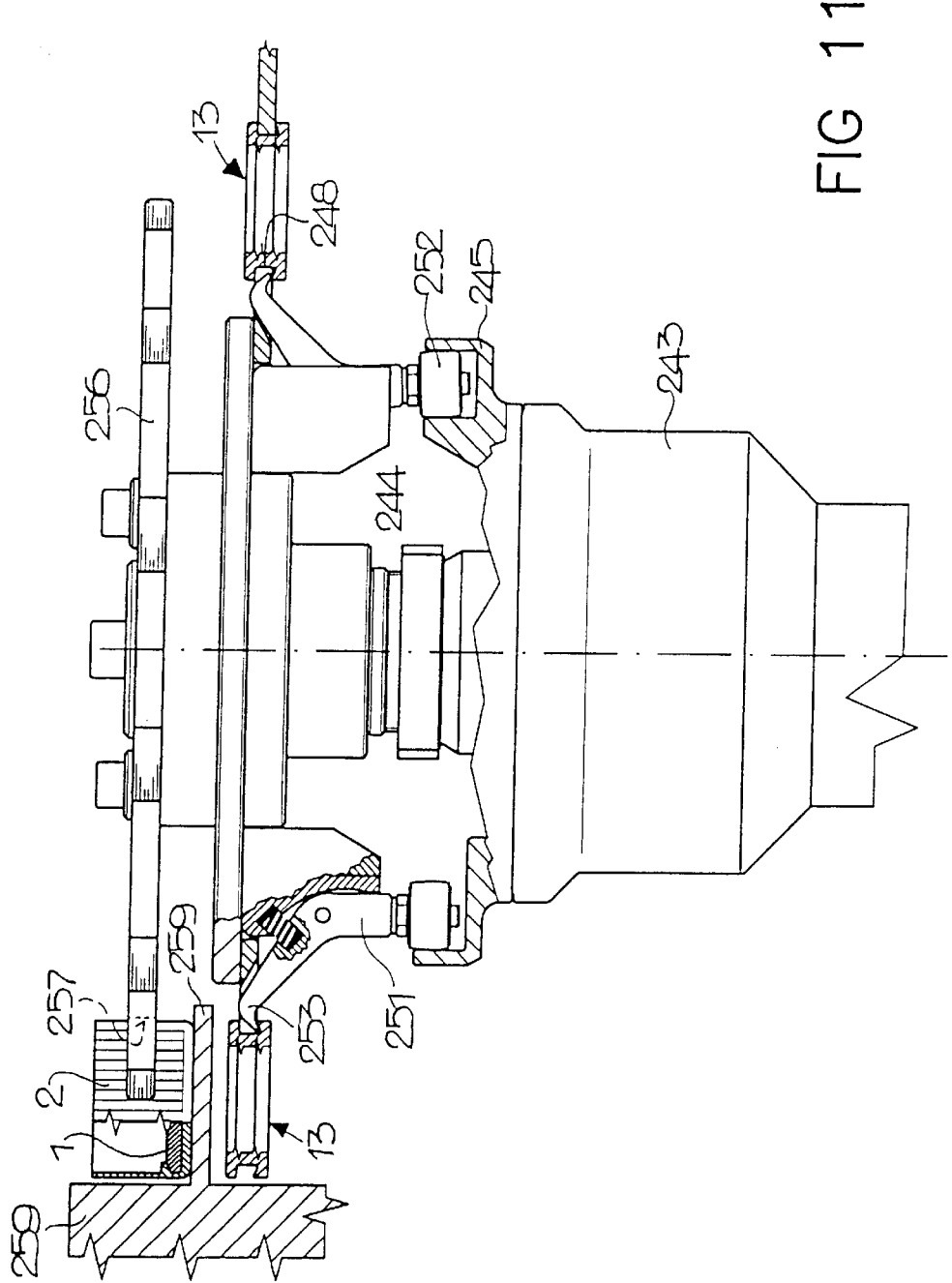
FIG. 11 is a transverse sectional view of the third star, taken along the plane XI—XI of FIG. 1.

The third transfer star 16, shown in FIG. 11, differs from the stars 14, 15 by virtue of the presence of a second star-shaped flange 256, which is superimposed on the first flange 246 and is provided with semicircular recesses 257 that are superimposed on the recesses 248 of the underlying ring 247, in order to convey the caps 2, after the application of the liners 1, toward the removal conveyor 12. The completed caps are moved by the flange 256 over a flat sliding sector 258, which is co-planar to the sector 240 and is arranged at a level between the recesses 257 and 248. The sector 358 is concentric to the rotation axis of the star 16 and is provided with a perimetric shoulder 259 that prevents the caps from exiting by centrifugal force from the recesses 257.

The operation of the apparatus according to the invention is as follows. The plastic material in the pasty state is expelled from the extruder 3 through the nozzle 4. The dosage carousel 6, by virtue of the star 65 and the pins 77, rotationally entrains in the direction B the shuttles 13, which are mutually equidistant and form a train that traces a closed three-lobed path. In particular, the rolling of the internal rollers 80 on the cam 35 of the dosage carousel 6 (FIGS. 2 to 4) allows the sliding of the spindles 76 within the sleeves 76 and accordingly allows the engagement of the pins 77 in the holes 89 of the shuttles 13, which are retained within their own semicircular seats 66.

The movement of the bowls 59 for taking the plastic material is actuated by the rolling of the internal rollers 42 on the cam 33, which causes the vertical sliding of the columns 40.

Each bowl 59, when it passes over the nozzle 4 of the extruder, is at a level by virtue of which it collects, by skimming, a preset dose M of plastic material in the pasty state, which by virtue of the combined action of the piston 46 and the air introduced through the connector 53 and ejected through the opening 62 is then expelled from the bowl 59 and deposited onto the pad 92 of the underlying shuttle 13, to which it adheres. The movements of the pistons 46 are induced by the rolling of the pair of rollers 51 on the cam 38, while the sliding of the rollers 52 within the vertical slot 50 prevents the rotation of the pistons 46 about their own axis.

After depositing the doses M on the shuttles 13, the pins 77 are lowered by the cams 35, so that the shuttles 13 are released in succession and transferred onto the first star 14. In this case also, the motion of the rollers 79 in the vertical slots 73 prevents the spindles 76 from being turned about their own axis. The temperature of the shuttles 13 is regulated by feeding a fluid in the region of contact 63 through the delivery duct 82 and the discharge duct 83.

The shuttles 13, provided with the dose M on their respective pads 92, after being transferred in succession into the respective recesses 248 of the star 14, are retained by the engagement performed by the claws 253 on the lower collars 87 of the shuttles. The retaining action by means of which the claws 253 retain the shuttles is applied by the springs 255; release is actuated by the cam 245, which by acting on the levers 251 raises the claws 253 from the collars 87 of the shuttles, allowing them to exit from the recesses 248.

The first star 14, by turning in the direction H that is opposite to the direction of the dosage carousel 7, then transfers the shuttles 13 with the doses M onto the molding carousel 8 (FIGS. 5 and 6).

The molding carousel 8, which rotates in the direction B, which matches the direction of the dosage carousel 7, accommodates the shuttles 13 between the prongs of the lower forks 163, which engage the slot 85 of said shuttles.

The shuttles are then locked by the subsequent upward stroke of the complementary male mold parts 118, actuated by the cams 113, which causes the pivots 157 to engage the holes 89 of the shuttles 13 so that they cannot escape from the seats 163 of the block 161.

As the upward stroke of the complementary male mold parts continues, the shuttles 13 make contact with the lower edge of the bushes 131 and therefore actual molding begins, compressing the doses M of plastic material deposited earlier onto the shuttles 13 against the bottoms of the cups 130 so as to form disk-like liners 1.

The molding performed by each assembly composed of a male mold part 117 and a complementary male mold part 118 occurs according to the following sequence.

In the initial position (shown in FIG. 6), i.e., when the resistance to compression offered by the dose M is not yet significant, the screw 147 abuts against the abutment 148, and the spring 153 is locked, in the preloading condition, between the bottom of the recess 154 and the collar 150 of the spindle 145. The interspace 158 between the center bearing 155 and the edge of the tang 146, owing to the preloading of the spring 151, remains unchanged.

As the resistance offered by the dose M increases as the stem 138 and the spindle 145 rigidly coupled thereto rise, the spindle 145 moves with respect to the tang 146, so that the center bearing 155 stops against the lower edge of the tang 146, allowing the collar 150 to move away from it.

At this point one has the situation illustrated at the left side of FIG. 5, in which the maximum compression thrust applied by the cam 113 is transmitted to the tang 146 and therefore to the shuttles 13 through the two springs 151 and 153, which are arranged in parallel.

The doses M of plastic material are determined so as to widen due to the compression until they occupy all of the chamber that lies between the shuttle 13 and the bottom of the cup 130 and is surrounded peripherally by the bush 131. Once the liners 1 have been molded, the cam 113 allows the spindles 145 to move downward, so as to allow the collar 150 to abut against the center bearing 155 and then, by descending further, to entrain it under the edge of the tang 146, so as to render ineffective the lower spring 153, which is once again locked between the collar 150 and the stem 138. When the center bearing 155 descends below the edge of the tang 146, the compression with which the complementary male mold part 118 acts on the molded liner is applied only by the upper spring 151 and is maintained thereby by the cam 113 through a rotation angle of the carousel 6 that is sufficient to ensure that the shape of the liners is maintained until it has stabilized.

Once the molding step has ended with the spacing of the complementary male mold part 118 from the male mold part 117, the shuttles that support the already-molded liners 1 are then transferred, using the same method, onto the second star 15 and from there to the insertion carousel 9, where the liners 1 are separated from the shuttles 13 along a first arc of rotation and the liners are inserted in the caps 2 conveyed by the feeder 10 along a subsequent arc. The shuttles 13 transferred by the star 15 onto the carousel 9 rest on the sliding track 217 and are inserted in the semicircular recesses 216 of the lower ring (star) 215, where they are retained by the pins 234 in the same manner as the pins 77 of the dosage carousel 7. When the locking of the shuttles by means of the pins 234 is completed, the sleeves 191 are lowered in succession by means of the cam 211 and peripherally clamp, with their lower edge, the liners on the region of the shuttles that lies outside the depression 90. At this point, compressed air is injected and, through the channels 238 and the passages 237, 236, 235, 94, 95, acts under the liners, inflating them from below and detaching them from the shuttles except for the perimetric portion, which remains clamped under the edge of the sleeves 191 and in any case can be detached easily owing to the limited adhesion capacity of the shuttle in this region.

Once the separation of the liners has been completed, and before lifting the sleeves 191, suction is activated through the coupling 202, the passages 200, 199–195 and finally the holes 205, so that the liners remain attached to the nozzles 204, assuming a slightly cambered shape owing to the slightly elevated position of the nozzles 204 with respect to the edge of the sleeves 191.

By means of the cyclic actuation of the columns 179 performed by the cam 173, the sleeves 191 and the nozzles 204 are raised until the liners lie at a higher level than the star 215. When, during the rotation of the carousel 9, the liners 1 overlap the caps 2 fed by the feeder 10 on the sliding sector 240, the cam 211 actuates the descent of the nozzles 204, which positively insert the liners 1 in the caps 2, where they are released by interrupting the suction.

The completed caps, entrained by the upper plate 218 on the sector 240 of the carousel 9, at the exit of said carousel, are inserted in the recesses 257 of the upper flange 256 of the star 16 and entrained along the co-planar sector 258 up to the removal conveyor 12, onto which they are deposited. At the same time, the shuttles 13, without the liners, are released by the claws 253 that retained them in the recesses of the lower star 247 and continue toward the dosage carousel. The cycle is then repeated in the manner described above.

It has thus been shown that in the described apparatus the shuttles do not have to slide on sliding surfaces during their travel, since they are locked in the seats of the carousels by the pins 77, 234 and by the pins 157 and in the recesses of the transfer stars by the claws of the levers 251. Furthermore, the three transfer stars allow to convey the shuttles safely and effectively even for high production rates. The presence of the adhesive element on the shuttles ensures effective adhesion of the plastic material thereon, while the removal and deposition means allow easy separation of the disk.

Another advantage is the possibility allowed by the apparatus to reduce the compression force, after molding the liners, to a value that maintains the shape of the liners and allows to reduce the mechanical stresses on the male mold parts and complementary male mold parts.

The invention thus conceived is susceptible of numerous modifications and variations, all of which are within the scope of the inventive concept.

Figures 12, 13:
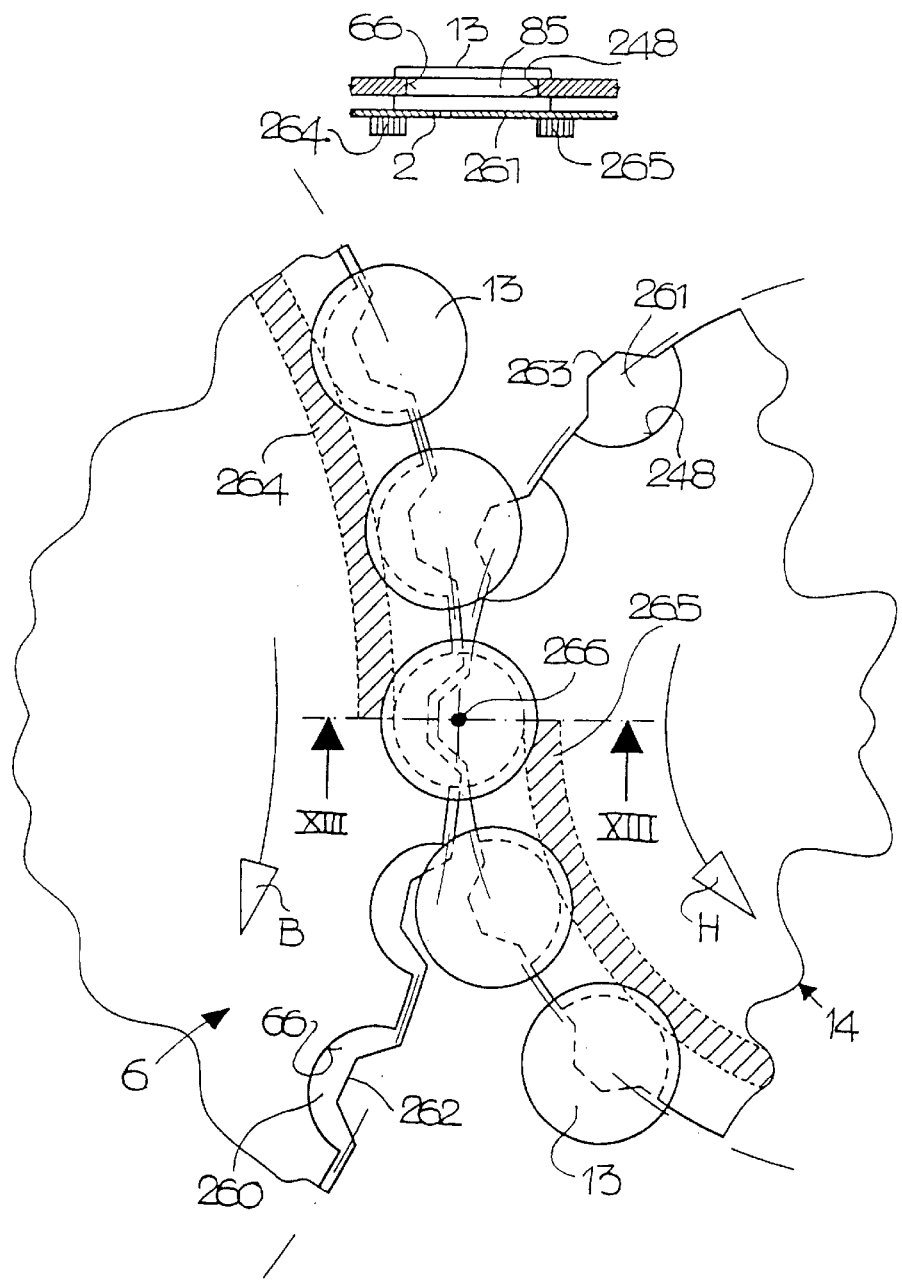
FIG. 12 is a schematic view of further embodiment of the retention means.
FIG. 13 is a sectional view, taken along the plane XIII—XIII of FIG. 12.

FIGS. 12 and 13 illustrate a further embodiment of the retention means, in which respective wings 260, 261 protrude into the seats for accommodating the shuttles 13 provided in the carousels and in the transfer stars (which are assumed hereinafter, for the sake of illustration, to be the seats 66 of the carousel 6 and the seats 248 of the star 14); the wings 260 have curves 262 that are complementary to protrusions 263 of the wings 261, so as to provide a sort of meshing during the rotation of the carousels and of the stars.

Magnetic tracks 264, 265 lie below the seats 66, 248 and along the portions of the paths traced by the shuttles 13 about the rotation axes of the carousel 6 and of the transfer star 14 and are interrupted at the point of tangency 266 between the carousel and the star. In this manner, by providing shuttles made of ferromagnetic material, when the point of tangency 266 is passed, the shuttles are no longer affected by the attraction force applied by the magnetic track 264 of the carousel 6 and come under the effect of the track 265, so as to be retained in the seat of the star 14. It should be noted that by using shuttles provided with an external slot 85, such as the ones described above, the wings 260, 261 can be omitted, since the shuttles are supported by the edges of the seats 66, 248 that engage in the annular slot 85.

Figures 14, 15:
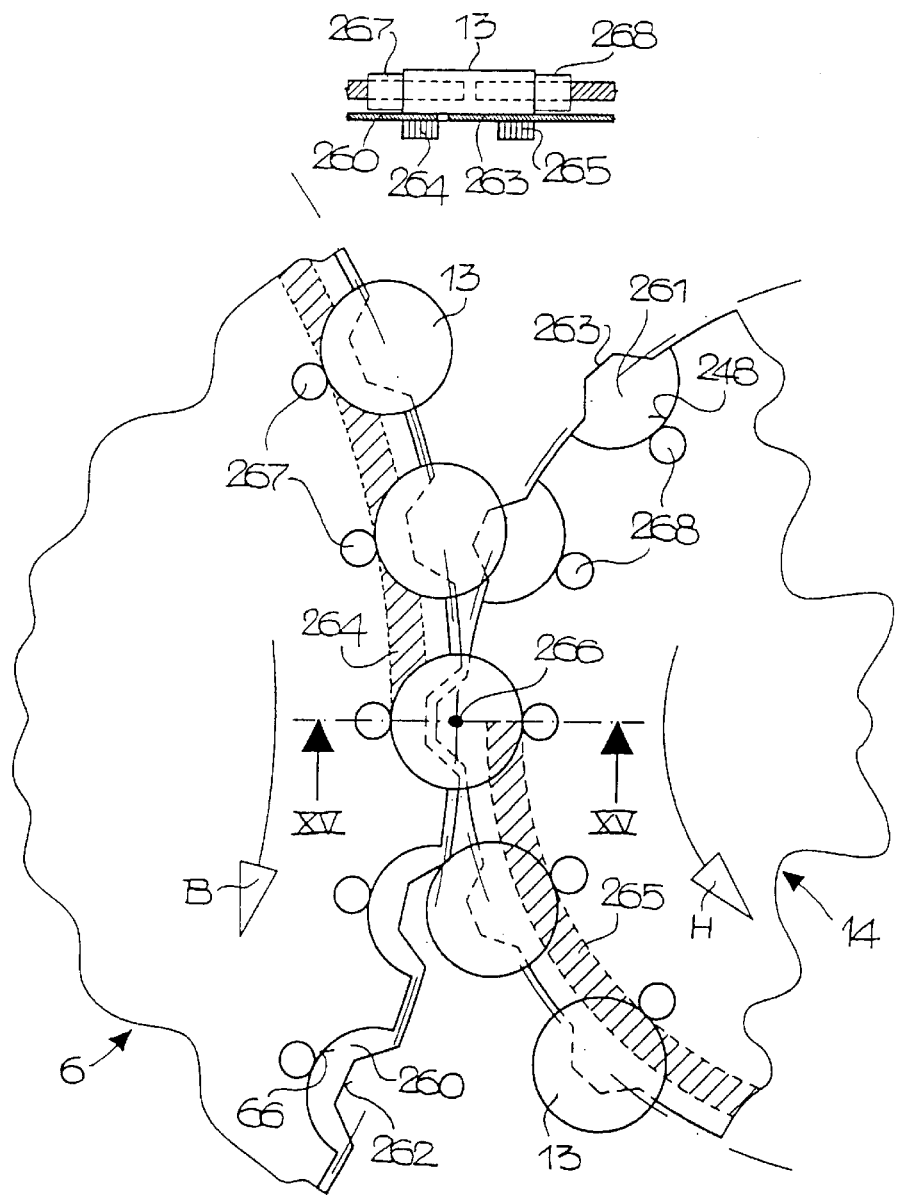
FIG. 14 is a schematic view of a still further embodiment of the retention means.
FIG. 15 is a sectional view, taken along the plane XV—XV of FIG. 14.

If instead the shuttles 13 do not have an annular slot and consist of cylindrical disks, it is convenient to provide, according to a still further embodiment of the retention means shown in FIGS. 14 and 15, retention magnets 267, 268 that are arranged at the seats 66 and 248 of the carousel 6 and of the star 14. Said magnets keep the shuttles inside the respective seats.

In this last case it is possible to provide a different embodiment yet of the retention means shown in FIGS. 16 and 17, in which two redirection elements 269 and 270 are provided in order to transfer the shuttles and are shaped like side walls that are concentric to the respective rotation axes of the carousel and of the star and separate the shuttles from the magnets of the carousel in order to guide them and insert them in the seats of the star.

In another embodiment, the shuttles are retained on the carousels and on the transfer stars by clamp elements actuated by stationary cams and shaped so as to grip the shuttles in diametrically opposite points.

In the practical embodiment of the invention, all the details may be replaced with other technically equivalent ones.

The disclosures in Italian Patent Application No. BO2001A000555 from which this application claims priority are incorporated herein by reference.

What is claimed is:

1. An apparatus for molding and inserting, in caps, liners made of plastic material dispensed by an extruder, comprising:

a footing;

a dosage carousel;

a molding carousel;

an insertion carousel;

a feeder for feeding the caps to said insertion carousel, said dosage, molding and insertion carousels being supported at said footing rotatable about vertical axes thereof and being provided with seats;

a plurality of shuttles supported at said seats angularly equidistant about and arranged equally spaced from the said rotation axes of the respective dosage, molding and insertion carousels, with said dosage carousel being provided with assemblies for taking in succession doses of the plastic material from said extruder and depositing the doses onto said shuttles, said molding carousel being provided with assemblies for molding in succession the liners on said shuttles, and said insertion carousel being provided with assemblies for removing in succession said liners from said shuttles and inserting the liners in respective caps fed by said feeder;

a first transfer star rotatable about an axis thereof for transferring said shuttles with the respective doses of plastic material deposited thereon from said dosage carousel onto said molding carousel;

a second transfer star rotatable about an axis thereof for transferring said shuttles with the respective liners formed thereon from said molding carousel onto said insertion carousel;

and a third transfer star mechanism rotatable about an axis thereof for transferring said shuttles from said insertion carousel onto said dosage carousel and for transferring said caps with liners inserted therein to a removal means for removing said caps with liners inserted therein from the apparatus;

first retention means provided at said dosage carousel, said molding carousel and said insertion carousel, respectively, for retaining said shuttles in axial alignment respectively with said assemblies for taking the doses of plastic material of said dosage carousel, with said assemblies for molding the liners of said molding carousel, and with said assemblies for removing in succession said liners from said shuttles and inserting the liners in respective caps fed by said feeder of said insertion carousel, second retention means at said first and second transfer stars and at said third transfer star mechanism for retaining the shuttles, said second retention means being actuated so as to retain said shuttles received from said first retention means of one of said carousels and release the retained shuttles to said first retention means of the next one of said carousels.

2. The apparatus of claim 1, comprising a stationary cam, each one of said first means for retaining the shuttles comprising a spindle, which is guided vertically in a vertical seat formed in a rotating plate of a respective one of said carousels and aligned with a respective seat for supporting a shuttle, said spindle being controlled by said stationary cam and adapted to actuate said spindle between a raised position for engaging in a hollow of the respective shuttle accommodated in the respective seat aligned therewith and a disengagement position to allow the extraction of said respective shuttle from said respective seat and passage thereof onto the respective one of said transfer stars or said third transfer star mechanism.

3. The apparatus of claim 2, further comprising a supporting surface, said third star mechanism comprising a lower disk and an upper disk, which are coaxial and are provided with semicircular peripheral recesses, that form angularly equidistant and superimposed seats, said lower disk being adapted to accommodate, in seats thereof, said shuttles after the liners are removed therefrom in order to transfer the shuttles after the liners are removed therefrom from said insertion carousel onto said dosage carousel, said upper disk being adapted to accommodate in seats thereof said caps in order to move the caps, after the insertion of the liners in said caps, on said supporting surface, said supporting surface being concentric to the rotation axis of said third star mechanism and lying between said upper disk and said lower disk in order to aid the transfer of said caps from said insertion carousel onto said removal means.

4. The apparatus of claim 3, further comprising a side wall that lies around said supporting surface and is concentric to said rotation axis of said third star mechanism.

5. The apparatus of claim 3, comprising an actuation cam, said lower disk of said third star mechanism having, at each seat for receiving a respective shuttle, the second retention means for retaining the shuttles being controlled by said actuation cam so as to retain said shuttles during the transfer of said shuttles between said insertion carousel and said dosage carousel.

6. The apparatus of claim 5, wherein said shuttles have a peripheral slot for insertion in said seats which forms an upper collar and a lower collar, each one of said second retention means for the third star mechanism comprising: a lever that is articulated on a plane that is radial to the rotation axis of said third star mechanism, said lever having a first arm, which is controlled by said actuation cam, which actuation cam is stationary and concentric to said axis of said third star mechanism, and a second arm provided with a claw adapted to engage on said lower collar in order to retain said shuttles in the respective seats; and spring means for actuating said second arm.

7. The apparatus of claim 6, wherein said molding carousel comprises a drum for supporting the assemblies for molding the liners, which drum comprises and upper drum collar and a lower drum collar having seats thereof, each one of said assemblies being composed of: a male mold part; a complementary male mold part, which are accommodated in the seats of said upper collar and said lower collar respectively; elastic return means; a bush that can slide on said male mold part in contrast with said elastic return means and forming, together with said male mold part, an annular interspace in which compressed air is delivered, said male mold part being arranged inside said bush; said complementary male mold part comprising a stem; a stationary axial cam for controlling movement of said stem; a spindle that is axially rigidly coupled to said stem; a tang in which said spindle is guided, and has, at a top part thereof, a pivot for engaging in a hollow of said shuttles, a first spring, which is arranged on said spindle and acts between a ring of said spindle and said tang in order to actuate said spindle into abutment against a shoulder of said tang; a center bearing; a second spring, which is arranged between said stem and said center bearing for supporting said tang and said ring; a respective rod being rigidly coupled to said stem and being able to slide in a seat of said drum lower collar; and a block, fixed to said rod, which is provided with two superimposed forks that form two curves for engaging on said bush and respectively in said slot of a respective one of said shuttles in order to raise the shuttle so as to rest against said male mold part when said complementary male mold part is raised to mold a liner.

8. The apparatus of claim 2, comprising: a duct for delivering compressed air connected to each one of said seats of said insertion carousel, passages, connected to said duct, that pass through each of the spindles of the insertion carousel and a said shuttle and lead onto a surface of a said shuttle on which a said liner has been molded in said molding carousel and to which a said liner adheres, said duct conveying compressed air under a molded liner in order to separate the liner from said surface to which it adheres; and clamping means for clamping perimetrically and hermetically said liner on said surface.

9. The apparatus of claim 8, comprising a pad made of a material adapted to retain by adhesion a dose of plastic material that is deposited thereon at said dosage carousel and a cup that contains said pad, said shuttles each having a cavity that accommodates said cup.

10. The apparatus of claim 9, wherein said cup is contained in a depression of a respective one of said shuttles and is surrounded peripherally by an annular opening that is connected to said compressed air delivery duct through said passages of a respective said spindle of said insertion carousel.

11. The apparatus of claim 8, wherein each one of said clamping means comprises a sleeve and a suction element movable inside said sleeve and cam means for actuating said sleeve and said suction element between a lowered position, in which said sleeve clamps a peripheral edge of said liner on a respective shuttle during the separation of the liner and when said suction element is connected to a suction duct in order to pick up said liner from the respective shuttle, and a raised position, in which said sleeve and said suction element are raised to a higher level than caps fed by said feeder to allow said suction element to descend into said caps and deposit said picked-up liners.

12. The apparatus of claim 1, further comprising respective ducts for delivery and return of a temperature regulation fluid, said ducts being connected to said seats of said dosage carousel.

13. The apparatus of claim 1, wherein said shuttles are made of ferromagnetic material, said first retention means comprising wings made of diamagnetic material for supporting said shuttles arranged in said seats of the carousels and magnetic tracks arranged under said wings and adapted to retain said shuttles on said carousel seats and being arranged along paths traced by the shuttles and substantially comprised between points of tangency of said carousels with respect to said stars or said star mechanism.

14. The apparatus of claim 13, wherein said second retention means of the transfer stars and the transfer star mechanism includes wings made of diamagnetic material that include protrusions that are adapted to engage in recesses of the wings made of diamagnetic material of said carousels, at a point of tangency of said carousels with respect to said stars and said star mechanism.

15. The apparatus of claim 14, comprising magnets provided at said seats arranged on said carousels and on said stars and said star mechanism for accommodating the shuttles, in order to attract and retain said shuttles in said seats.

16. The apparatus of claim 1, wherein said shuttles are made of ferromagnetic material and wherein said first and second retention means for retaining the shuttles comprise wings for supporting said shuttles arranged in said seats of the carousels and of the transfer stars and transfer star mechanism, respectively, magnets adapted to retain said shuttles in said seats of the carousels, transfer stars, and transfer star mechanism, and redirection elements that lie between points of tangency of said carousels with respect to said stars and said star mechanism in order to extract said shuttles from the seats of the carousels and insert the shuttles in the seats of the stars and the star mechanism and vice versa.

* * * * *